United States Patent Office 3,071,104
Patented Jan. 1, 1963

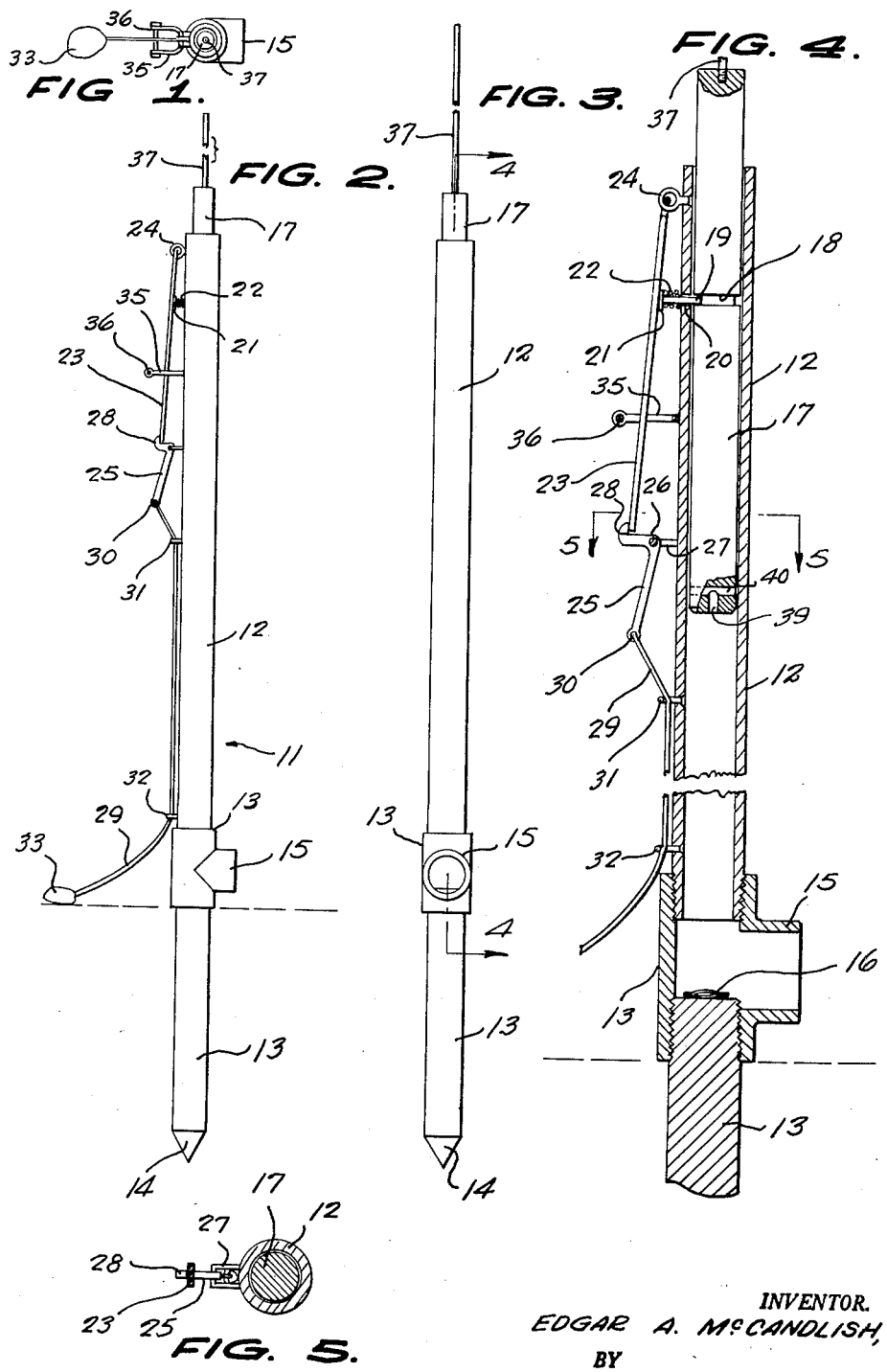

3,071,104
APPARATUS FOR FRIGHTENING ANIMALS
Edgar A. McCandlish, Lambertville, Mich.
Filed Aug. 25, 1961, Ser. No. 133,881
3 Claims. (Cl. 116—22)

This invention relates to devices for frightening animals, for example, for frightening dogs and cats from areas where they would otherwise create a nuisance, for example, from areas containing refuse receptacles, garden areas, or the like.

A main object of the invention is to provide a novel and improved apparatus for frightening small animals such as dogs, cats, or the like from areas to be protected, the device being simple in construction, being easy to set up for use, and operating to frighten the animals without causing any harm to them.

A further object of the invention is to provide an improved apparatus for frightening animals such as dogs, cats, and the like, from an area to be protected, the device being inexpensive to manufacture, being durable in construction, being easy to reset, and providing a loud detonation which is of sufficient intensity to frighten away any animals in the vicinity, and after several operations thereof, to keep the animals permanently away from the area containing the device.

Further objects and advantages of the invention will become apparent from the following description and claims, and from the accompanying drawings, wherein:

FIGURE 1 is a top plan view of an improved apparatus constructed in accordance with the present invention.

FIGURE 2 is a front elevational view of the apparatus of FIGURE 1.

FIGURE 3 is a side elevational view of the apparatus shown in FIGURES 1 and 2.

FIGURE 4 is an enlarged vertical cross sectional view taken substantially on the line 4—4 of FIGURE 3.

FIGURE 5 is a horizontal cross sectional view taken on the line 5—5 of FIGURE 4.

Referring to the drawings, the apparatus is designated generally at 11 and comprises a hollow post member 12 which is threadedly secured at its bottom end in one end of a T-fitting 13, the opposite end of the T-fitting having threadedly engaged therein the top end of a solid stake element 13, the stake element having a pointed bottom end 14 so that it may be easily driven into the ground to support the hollow post member 12 in an upright position, as shown in FIGURES 2 and 3. The remaining arm 15 of the T-fitting 13 extends laterally, opening to the atmosphere and being arranged adjacent to the top end of the solid stake member 13, whereby easy access is provided into the T-fitting, enabling a conventional percussion-responsive cap 16 to be placed on the top end of said stake member, as illustrated in FIGURE 4.

Designated at 17 is an elongated solid hammer member which is slidably disposed in the hollow post member 12 and which is of substantial weight. The hammer member 17 is formed at its intermediate portion with an annular peripheral groove 18 in which is engageable the inner end of a locking pin 19 extending slidably through an aperture 20 provided in the wall of the hollow post member 12, the locking pin 19 being provided with a head portion 21 and with a biasing spring 22 which surrounds the shank of the pin and which bears between the head portion 21 and the wall of the post member 12, biasing the locking pin 19 outwardly, namely, to a release position relative to the hammer member 17.

As shown in FIGURE 4, the locking pin 19, when engaged in the groove 18, supports the hammer member 17 in a position elevated a substantial distance above the top end of the stake member 13, so that substantial impact will be delivered by the hammer member 17 on an explosive cap 16 when the hammer member 17 is released.

Designated at 23 is a holding rod which is pivotally engaged with an eye member 24 secured to the upper portion of the hollow post member 12 and which is engageable with the head element 21 of the locking pin 19 to hold the locking pin in engagement with the groove 18, as shown in FIGURE 4. Designated at 25 is a catch lever which is pivoted at 26 to a lug 27 secured to the post member 12 below the locking pin 19, the lever 25 having a detent lug 28 engageable with the free end of the holding rod 23 in the manner illustrated in FIGURE 4 to prevent outward rotation of the holding rod and to thus lock the rod in a position retaining the locking pin 19 in the groove 18. A flexible cable 29 is secured at 30 to the end of the lower arm of the catch lever 25, the cable 29 extending through a pair of vertically aligned eye members 31 and 32 secured to the hollow post member 12. Attached to the end of the cable 29 is a cloth bag 33 containing bait, such as meat, or the like, which normally rests on the ground adjacent the remaining portion of the device when the device is set up for use, as shown in FIGURE 2. As will be readily apparent, when an animal exerts a pull on the bait container 33, the tension is transmitted to the lower arm of the catch lever 25, causing the lever to be rotated in a counterclockwise direction, as viewed in FIGURE 4, thereby releasing the holding arm 23 and allowing the coiled spring 22 to move the locking pin 19 outwardly towards its release position. This allows the hammer member 17 to drop and to detonate the cap 16.

Outward rotation of the holding arm 23 is limited by the provision of a U-shaped bracket member 35 which is secured rigidly at its bight portion to the hollow post member 12 below the locking pin 19, the ends of the U-shaped bracket member 35 being connected by a transversely extending bolt 36 located to prevent outward rotation of the holding arm 23 beyond a predetermined position, said position being such that the locking pin 19 is prevented from disengaging from the aperture 20 in the post member 12.

As will be readily apparent, in order to reset the device, it is merely necessary to elevate the hammer member 17 to a position wherein the groove 18 is aligned with the locking pin 19, after which, the arm 23 is rotated inwardly sufficiently so that it may be held by the lug 28 on the catch lever 25. The arm 23 is retained in this position by the expansion force of the coiled spring 22.

To facilitate the resetting of the device, an upwardly extending rod 37 is secured to the top end of the hammer member 17, the rod 37 projecting above the top end of the post member 12 and being of sufficient length so that the rod may be easily grasped to elevate the hammer member 17 in order to reset the device.

The hammer member 17 is formed at its bottom end with a central bore 39 adapted to receive a blank cartridge, the central bore 39 communicating with a transverse bore 40 formed in the lower portion of the hammer member to allow for the escape of the gaseous products of combustion resulting from the detonation of the blank cartridge. A blank cartridge may therefore be employed in place of the explosive cap 16 shown in FIGURE 4, the cartridge being detonated by the impact developed when the hammer member 17 strikes the top end of the solid stake 13.

As will be readily apparent, any other conventional type of percussion-responsive explosive device may be employed between the anvil element defined by the top end of the stake 13 and the hammer member 17.

The open arm 15 of the T-fitting 13 provides ready access to the top end of the anvil element 13 so that all residue may be easily cleaned out. The open arm 15 of the T-fitting 13 also provides communication with the atmosphere so that the noise resulting from the explosion of the cap 16 or of any other percussion-responsive explosive device will not be muffled in any way and will create the intended effect.

As above mentioned, when the bait container 33 is pulled, the hammer element 17 is released, causing the detonation of the percussion-responsive explosive device, which produces a loud noise serving to frighten the animal from the area. After one or two such experiences, an animal will tend to stay away from the area and said area will thus be maintained free of nuisances caused by the activity of such animals.

While a specific embodiment of an improved animal-frightening apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An apparatus for frightening animals comprising a hollow post member adapted to be mounted in an upright position, an anvil element in said post member, a hammer member slidably mounted in the post member and being movable into striking engagement with said anvil element, a horizontal detent element extending slidably through the wall of the post member and being engageable with the hammer member to support same in an elevated position with respect to said anvil element, horizontally acting spring means mounted on said detent element and bearing between said detent element and said post member and biasing said detent element outwardly towards a release position, movable holding means releasably engaging said detent element and opposing said spring means, a bait member, and means connecting said bait member to said holding means and moving said holding means to release position responsive to a pull exerted on said bait member.

2. An apparatus for frightening animals comprising a hollow post member adapted to be mounted in an upright position, an anvil element in said post member, a hammer member slidably mounted in the post member and being movable into striking engagement with said anvil element, a percussion-responsive explosive device between said hammer member and said anvil element, a horizontal detent element extending slidably through the wall of the post member and being engageable with the hammer member to support same in an elevated position with respect to said anvil element, horizontally acting spring means mounted on said detent element and bearing between said detent element and said post member and biasing said detent element outwardly towards a release position, a holding member pivoted to said post member and releasably engaging the outer end of said detent element and opposing said spring means, a catch lever pivoted to said post member and releasably locking said holding member, a bait member, and means connecting said bait member to said catch lever and moving said catch lever to release position responsive to a pull exerted on said bait member.

3. An apparatus for frightening animals comprising a hollow post member adapted to be mounted in an upright position, an anvil element in said post member, said post member being formed with an opening adjacent said anvil element, a hammer member slidably mounted in the post member and being movable into striking engagement with said anvil element, a percussion-responsive explosive device between said hammer member and said anvil element, a horizontal detent element extending slidably through the wall of the post member and being engageable with hammer member to support same in an elevated position with respect to said anvil element, horizontally acting spring means mounted on said detent element and bearing between said detent element and said post member and biasing said detent element outwardly towards a release position, a depending holding member pivoted to said post member above said detent element and releasably engaging the outer end of said detent element and opposing said spring means, a catch lever pivoted to said post member below said detent element and having a detent lug engageable with the free lower end of said holding member, means connecting said bait member to said catch lever and rotating said catch lever to release position responsive to a pull exerted on said bait member, and upstanding rod means secured to the top end of said hammer member and projecting from the top of said post member.

References Cited in the file of this patent

UNITED STATES PATENTS

| 1,076,373 | Jensen | Oct. 21, 1913 |
| 1,434,132 | McDonald | Oct. 31, 1922 |

FOREIGN PATENTS

| 6,743 | Great Britain | of 1891 |